United States Patent [19]

Evans

[11] 4,199,159

[45] Apr. 22, 1980

[54] FLEXIBLE SEALING BOOT

[75] Inventor: Anthony C. Evans, Westland, Mich.

[73] Assignee: Kelsey-Hayes Company, Romulus, Mich.

[21] Appl. No.: 928,473

[22] Filed: Aug. 1, 1978

[51] Int. Cl.² .............................................. F16J 15/52
[52] U.S. Cl. ............................. 277/212 FB; 188/73.3
[58] Field of Search ........... 277/212 R, 212 C, 212 F, 277/212 FB; 188/73.3, 73.4, 73.6, 72.4

[56] References Cited

U.S. PATENT DOCUMENTS

| | | | |
|---|---|---|---|
| 3,403,932 | 10/1968 | Kutcher | 277/212 FB X |
| 3,476,417 | 11/1969 | Born et al. | 277/212 FB X |
| 3,942,611 | 3/1976 | Burnett | 188/73.3 |
| 4,109,976 | 8/1978 | Koch | 277/212 FB X |

FOREIGN PATENT DOCUMENTS

| | | | |
|---|---|---|---|
| 1181014 | 11/1964 | Fed. Rep. of Germany | 277/212 FB |
| 1212372 | 3/1966 | Fed. Rep. of Germany | 277/212 FB |
| 1625932 | 1/1970 | Fed. Rep. of Germany | 277/212 FB |
| 1421289 | 11/1965 | France | 277/212 FB |
| 699707 | 12/1965 | Italy | 277/212 FB |

Primary Examiner—Robert S. Ward, Jr.
Attorney, Agent, or Firm—Ralph J. Skinkiss

[57] ABSTRACT

A sealing boot of elastic material for use in a cylinder and piston assembly of an automotive vehicle brake system is disclosed. The boot seats upon the piston and has a radially extending bellows terminating at an annular ring adopted for retention in an annular groove circumscribing the cylinder opening. The boot annular ring is preferably enclosed or otherwise coated with elastomeric material to prevent corrosion thereof and resist disengagement from the receiving groove once seated therein.

5 Claims, 24 Drawing Figures

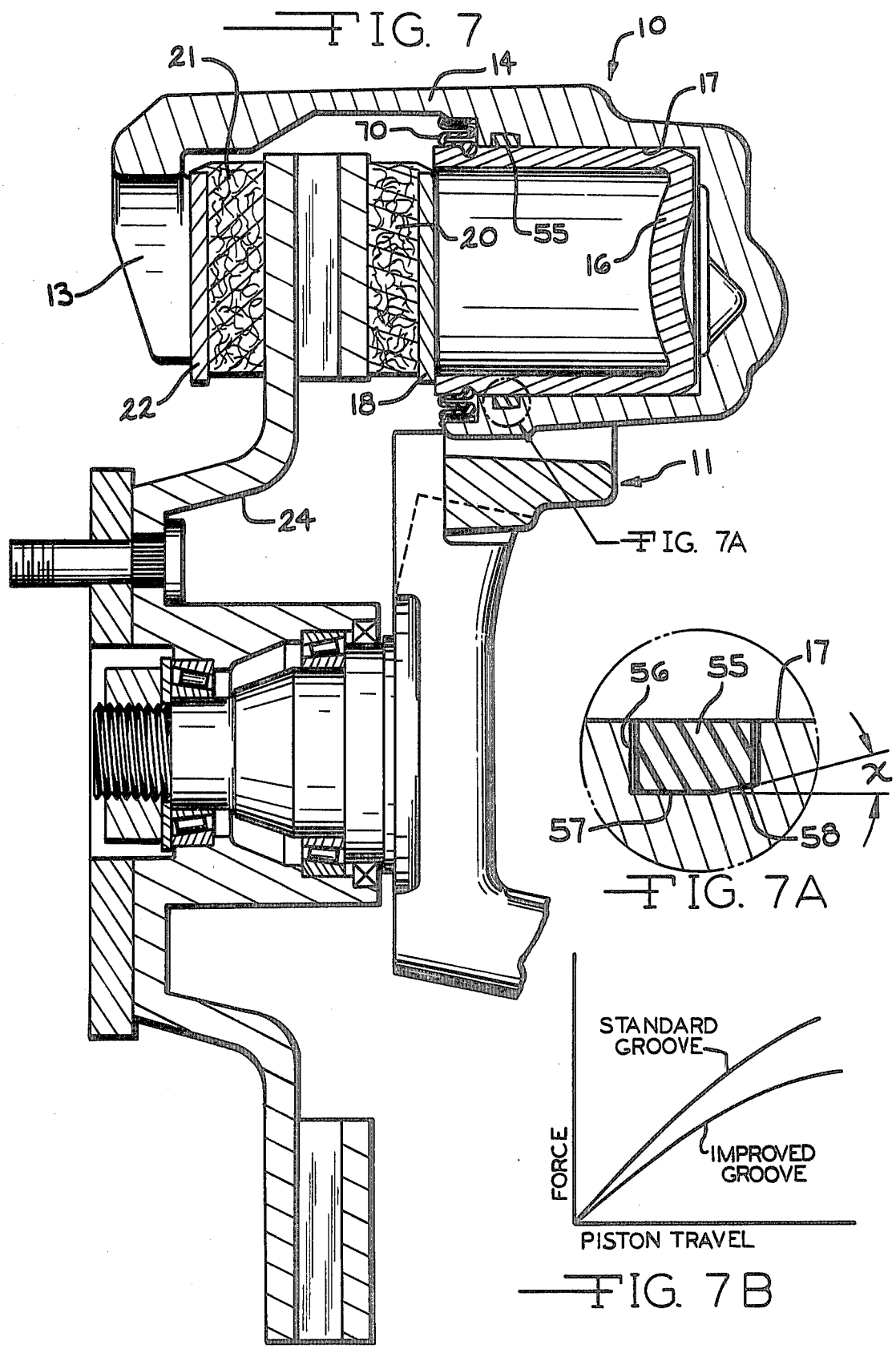

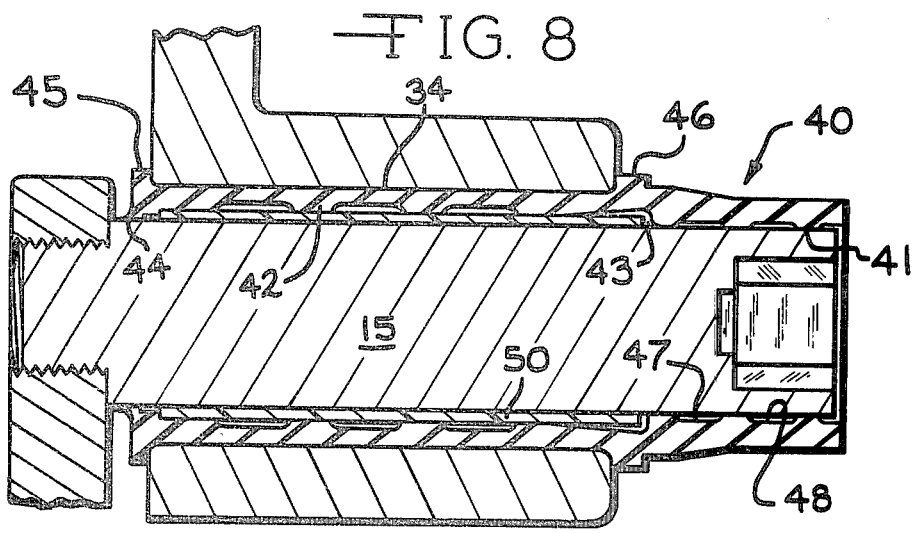
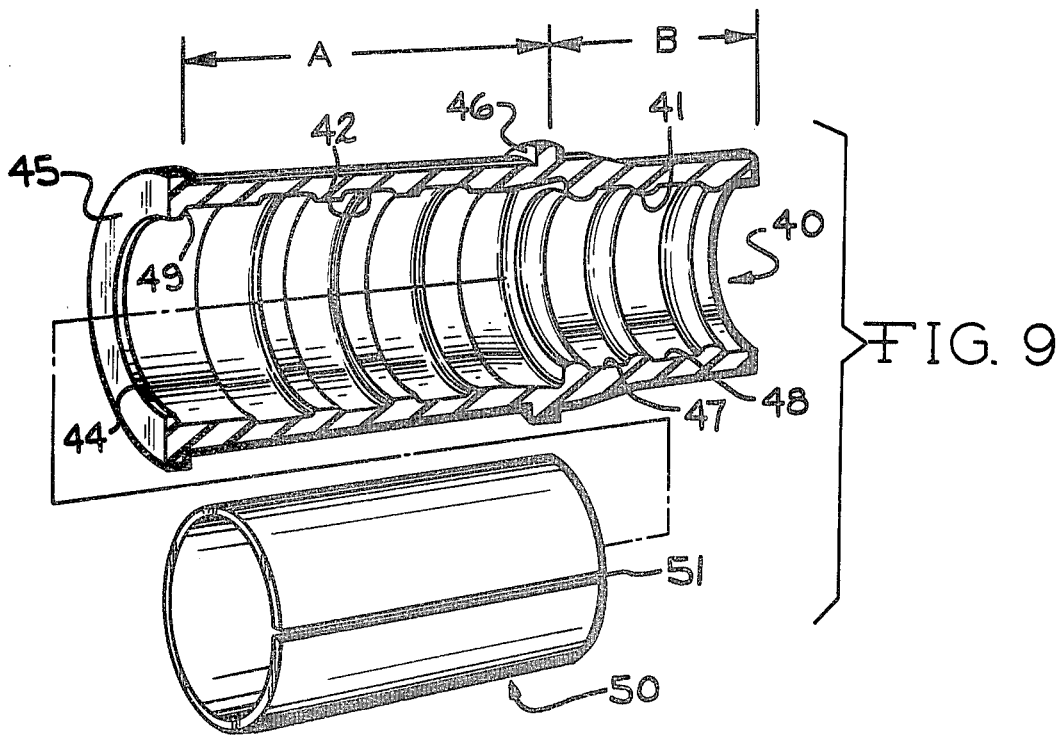
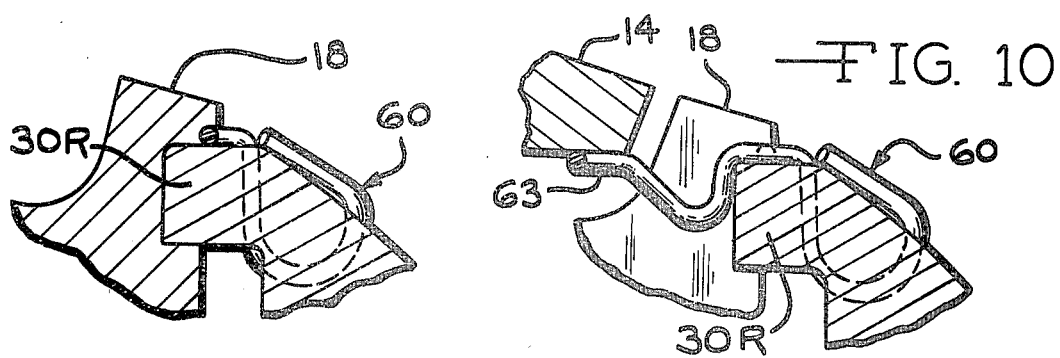

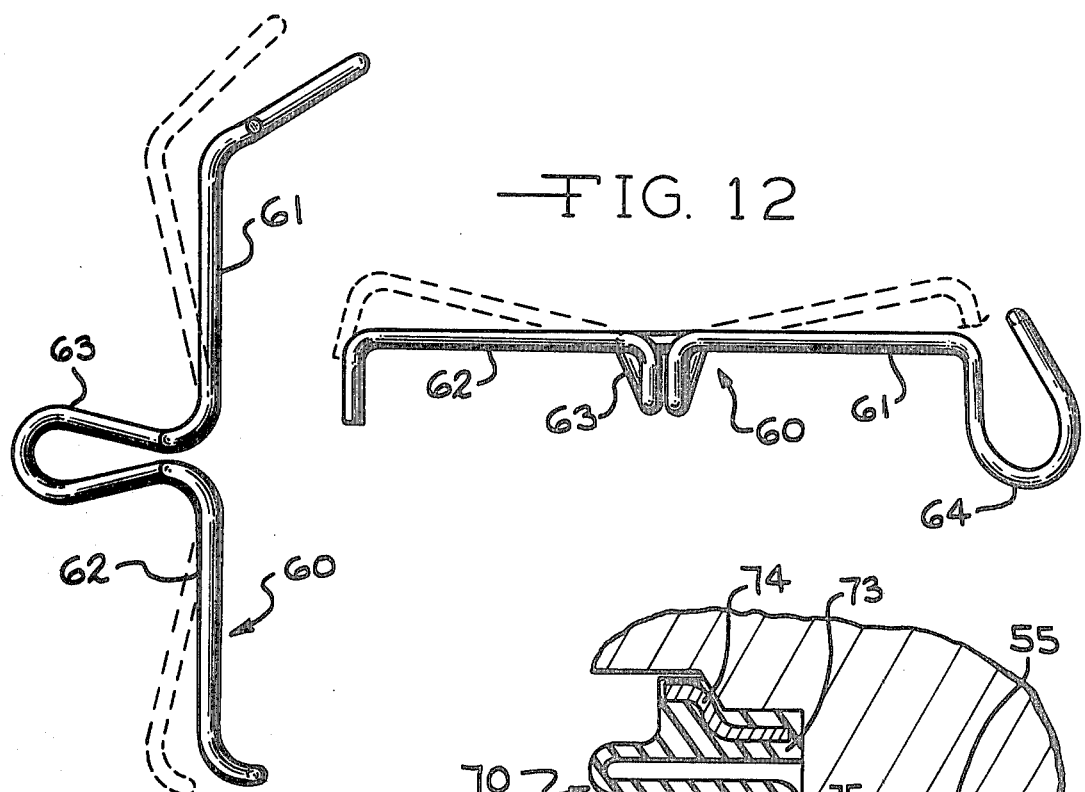
FIG. 12
FIG. 13
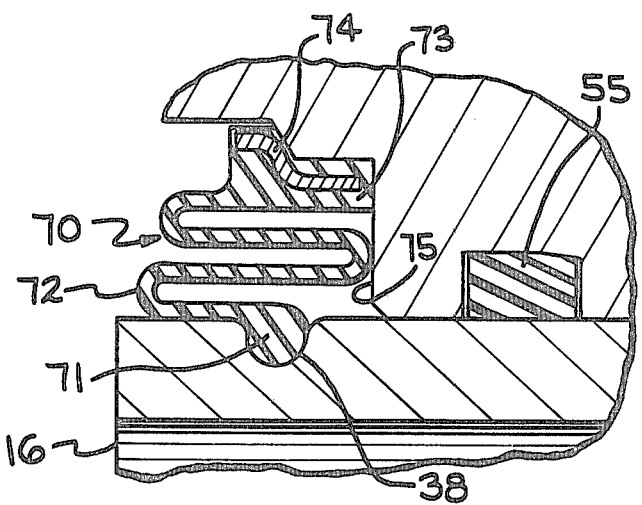
FIG. 14
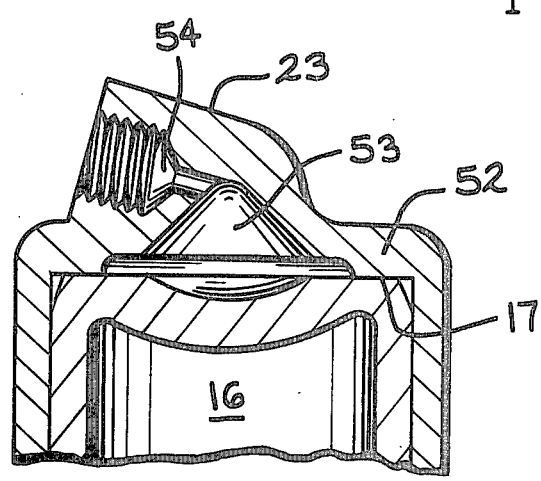
FIG. 15

FLEXIBLE SEALING BOOT

BACKGROUND OF THE INVENTION

This relates to improvements in hydraulically actuated disc brake piston sealing boots.

Conventional piston sealing boots of the prior art which are generally made of rubber or rubber-like material are difficult to install and often require special tools to expand the constricting bead portions or otherwise hold them in place within a receiving cylinder wall groove to permit insertion of the hydraulic piston. For example see U.S. Pat. Nos. 4,022,303; 3,983,969; or 3,942,611 for illustrations of sealing boots of such design.

SUMMARY OF THE INVENTION

It is therefore an object of my invention to provide an improved flexible piston sealing boot adapted for overcoming the above mentioned conventional draw backs.

It is another object of my invention to provide a flexible piston sealing boot which can be securely fitted to a cylinder and piston assembly without fear of withdrawl therefrom.

It is a further object of my invention to provide an improved flexible piston sealing boot capable of shielding the piston from dirt and other foreign matter when extended from the cylinder.

It is still another object of my invention to provide an improved flexible boot adapted to be mounted directly on the forward portion of the cylinder opening and external of the cylinder wall.

These and other objects and advantages of the present invention will be apparent from the following description and accompanying drawings.

DESCRIPTION OF THE DRAWINGS

FIG. 7 is a longitudinal cross-sectional view taken along line 7—7 of FIG. 1.

FIG. 7A is an enlarged view of the circled portion of FIG. 7 showing details of the piston hydraulic seal construction.

FIG. 7B is a plot of force resisting piston return versus return travel of the piston.

FIG. 8 is an enlarged cross-sectional view taken along line 8—8 of FIG. 5.

FIG. 9 is an exploded perspective view showing the pin bushing and sleeve assembly and details.

FIG. 10 is a cross-sectional view taken along line 10—10 of FIG. 5 showing the assembled position of the anti-rattle clip shown in FIGS. 12 and 13.

FIG. 11 is a cross-sectional view taken along line 11—11 of FIG. 5 showing the assembled position of the anti-rattle clip shown in FIGS. 12 and 13.

FIG. 12 is an elevational view of an anti-rattle clip used in the disc brake as shown in FIG. 1.

FIG. 13 is a plan view of an anti-rattle clip used in the disc brake as shown in FIG. 1.

FIG. 14 is an enlarged cross-sectional view of the piston dust boot used in the disc brake as shown in FIG. 1.

FIG. 15 is a cross-sectional view taken along line 15—15 of FIG. 3.

DETAILED DESCRIPTION OF THE INVENTION

Figure 1:
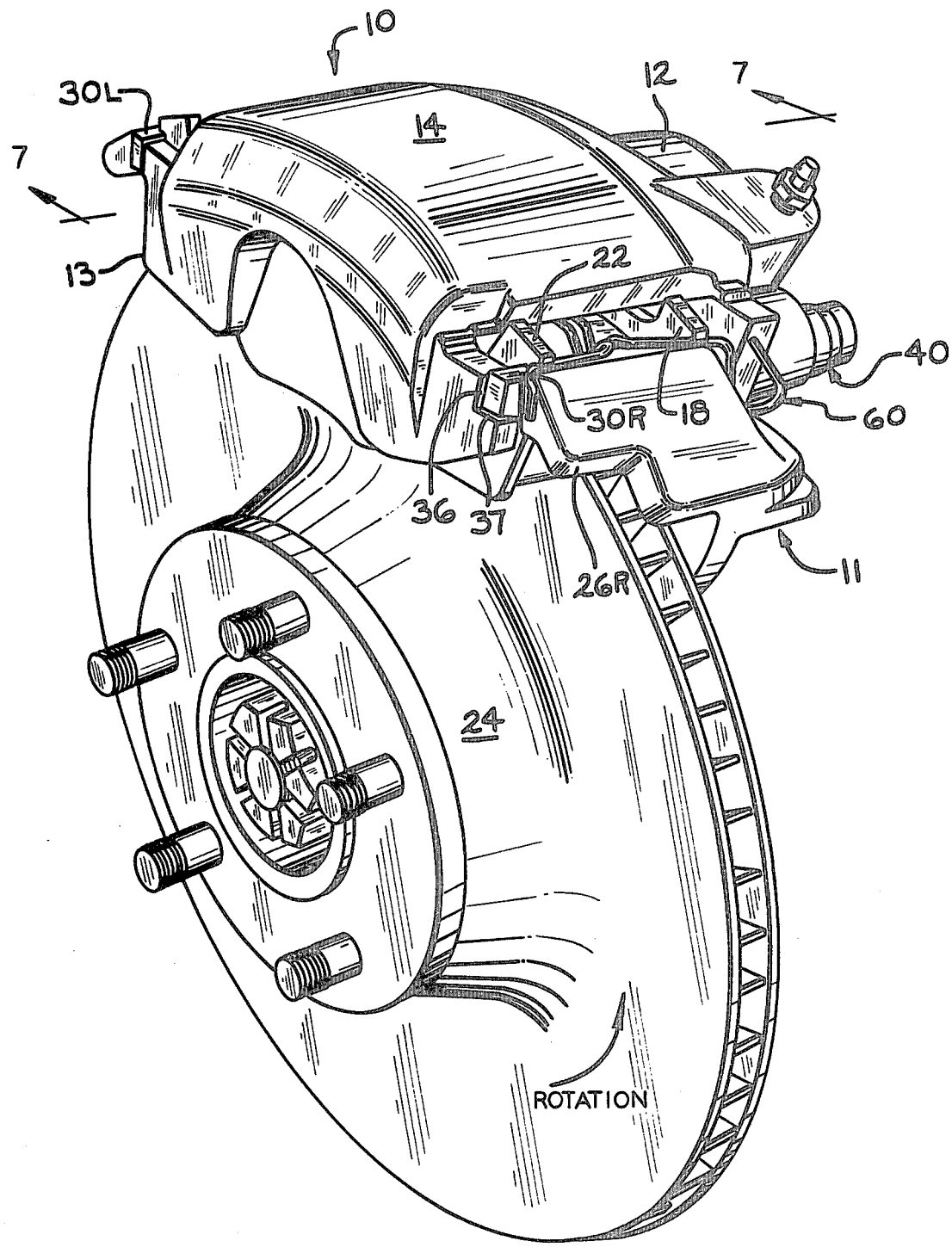
FIG. 1 is a perspective view of a disc brake made pursuant to the teachings of the present invention as viewed from the outboard side.
Figure 2:
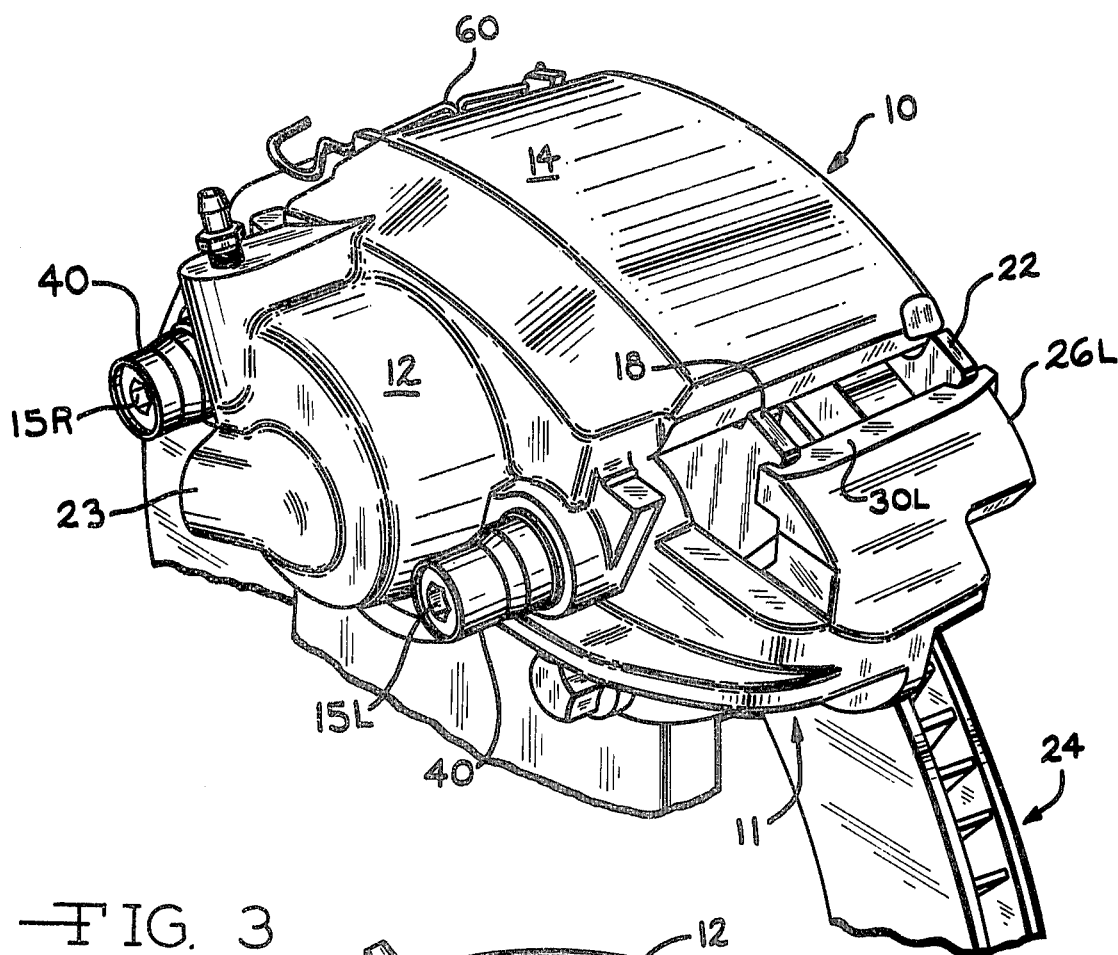
FIG. 2 is a perspective view of the disc brake shown in FIG. 1 as viewed from the inboard side.

Now referring to the drawings. The disc brake shown in FIGS. 1 through 7 comprises a generally C-shaped caliper 10 slidably supported on pins 15 secured to anchor plate 11 which is secured to a fixed part of the vehicle. Caliper 10 has a front or outboard leg 13 and a rear or inboard leg 12 interconnected by a bridge portion 14. The inboard caliper leg 12 contains the hydraulic actuation means comprising a piston 16 slidable in cylinder 17 and engaging back plate 18 of the inboard friction pad 20. An indirectly actuated outboard friction pad 21 has its back plate 22 engaged by the outboard caliper leg 13. When hydraulic fluid is forced into the actuator cylinder through inlet port 23, inboard pad 20 is urged into frictional engagement with the inboard side of rotor 24 whereupon caliper 10 is caused to slide on pins 15L and 15R thereby applying an inwardly directed force to outboard backing plate 22 causing frictional engagement of outboard friction pad 21 with the outboard surface of rotor 24.

Anchor plate 11 has two axially and outward extending arms 26L and 26R which extend over the periphery of the rotor and slidably support both the inboard friction pad backing plate 18 and the outboard friction pad backing plate 22 upon rail guides 30L and 30R by engagement of inboard backing plate guide grooves 32L and 32R and outboard backing plate guide grooves 33L and 33R. By this construction all braking friction torque is transferred directly to anchor plate support 11 and hence to the vehicle frame (not shown). The caliper 10 serves primarily as means for applying the necessary clamping forces to the brake shoe assemblies without having imparted thereto the braking torque.

Caliper 10 is slidably supported on pins 15L and 15R secured to anchor plate 11 preferably by threaded means. Pins 15L and 15R are each received in a bushing assembly, as shown in FIG. 9, which extends through bores appropriately positioned and configured in the caliper inboard leg 12.

Referring now to FIGS. 8 and 9. Bushing 40 is made of an elastomeric material, such as rubber, and comprises two zones. Zone A, extending between outboard flange 45 and inboard flange 46 extends through bore 34 in the caliper inboard leg 12 as shown in FIG. 8. Flanges 45 and 46 position, lock and retain bushing 40 within bore 34 and prevent axial movement of the bushing with respect to the caliper inboard leg. Positioned inside zone A of bushing 40 is sleeve 50, made of any suitable plastic or other low friction material such as "Teflon". Sleeve 50 functions as a low friction bearing within bushing 40 and is retained axially between radially extending portion 49 of flange 45 and annular recess 43. The inside cylindrical surface of zone A of bushing 40 may be provided with annular grooves 42 to allow for radial displacement of material upon insertion of pin 15 into sleeve 50. Sleeve 50 is preferably provided with a longitudinal gap 51 permitting ease of insertion into bushing 40. Zone B of bushing 40, extending inboard of caliper leg 12, is provided with a multiple number of annular ribs 41 generally having a circular cross-section; a preferable number being three as shown in FIGS. 8 and 9.

During assembly of the caliper brake, pin 15 is inserted into bushing 40 from the inboard side, first passing through zone B, then through sleeve 50 and threaded into or otherwise fastened to anchor plate 11. Annular recess 43 is thus provided to permit radial deflection of sleeve 50 into recess 43 thereby allowing passage of the pin leading edge through sleeve 50 without pushing the sleeve through the bushing ahead of the pin thusly dislodging sleeve 50 from its desired position within zone A. Further, upon insertion of pin 15 into bushing 40 ribs 41 in zone B slidingly engage pin 15, and are slightly compressed or deformed as shown in FIG. 8.

Once assembled and during brake actuation the caliper is free to slide axially upon pins 15. Lip 44 of flange 45 acts as a seal preventing entrance of dirt or other contaminants into the bushing assembly. Annular ribs 48, because of their seal like engagement of pin 15, form annular contamination chambers 47 and 48 thereby preventing dirt or other contaminants from entering the bushing from the inboard side. Thus a reasonably dirt free environment is assured between pin 15 and sleeve 50.

Caliper 10, supported upon pins 15L and 15R extending inboard from anchor plate 11 has no other principal means of support. Outboard leg 13 extends laterally between and abutingly engages anchor plate rails 30L and 30R through vertical abutment surfaces 35 and 36 respectively. Caliper 10 is principally restained from circumferential movement resulting from any possible brake shoe frictional drag forces, which may be imparted to caliper 10, by the interaction of abutment surfaces 35 and 36 with anchor plate rails 30L and 30R respectfully. The caliper is further restrained from possible radial or vertical movement by the interference of horizontal abutment surface 37 with anchor plate rail 30R.

Thus caliper 10 is supported and free to move in an axial direction upon pins 15L and 15R passing through the caliper inboard leg 12 and restrained from circumferential or vertical movement through interference abutments contained on the outboard leg. Thus movements of or forces imparted to caliper 10 as a result of brake activation are transmitted directly to anchor plate 11 without passing through supporting pins 15L and 15R.

Figure 3:
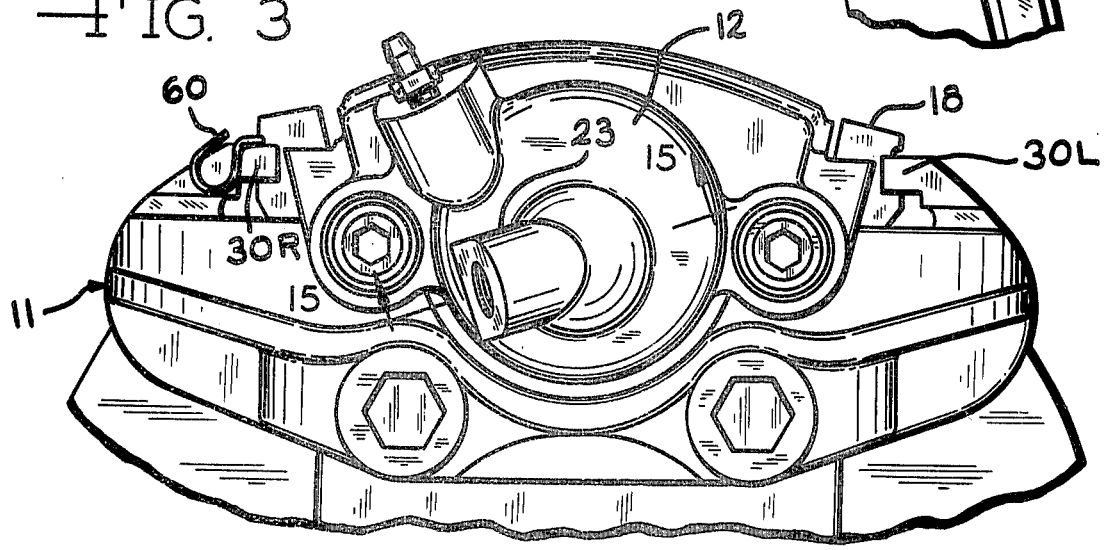
FIG. 3 is a rear elevational view of the brake shown in FIG. 1 as viewed from the inboard side.
Figure 4:
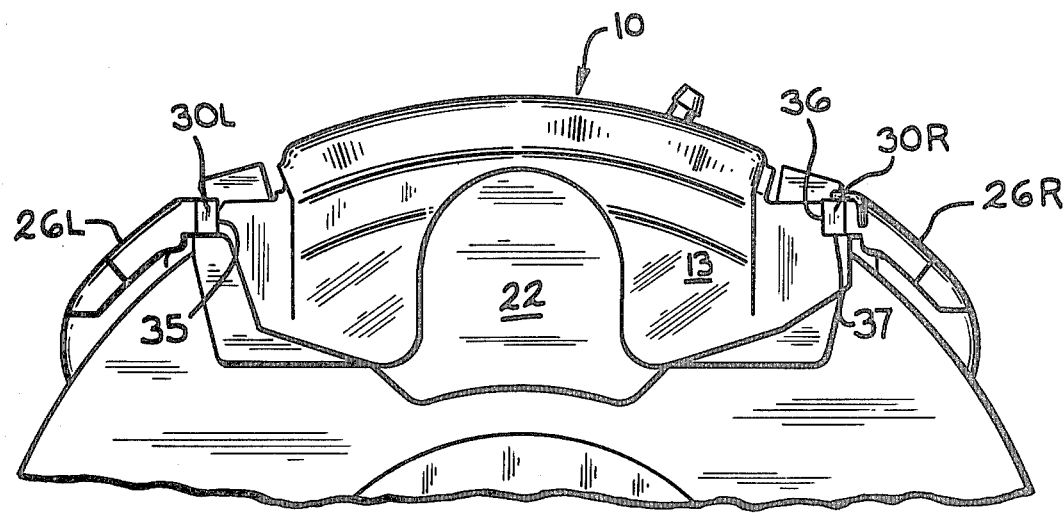
FIG. 4 is a front elevational view of the disc brake shown in FIG. 1 as viewed from the outboard side.

FIG. 15 presents a cross-sectional view taken along line 15—15 of FIG. 3 showing details of the rear portion of the hydraulic cylinder in caliper inboard leg 12. The cylinder rear wall 52 is provided with boss-like port 23 protruding therefrom and allows for cavity 53 to the rear of cylinder wall 17. Thus the cylinder inlet 54 may be bored directly into cavity 53 requiring no interior machining of the cylinder rear wall 52.

FIGS. 16 through 19 show the preferred structure of the inboard brake shoe assembly 19. Friction pad 20 is bonded, using any suitable bonding technique known to the industry, or may be integrally molded upon backing plate 18 using readily known methods. Backing plate 18 has a multiplicity of recesses or apertures such as the double step bore 27 shown in FIG. 19 extending through the backing plate. During molding of friction pad 20 upon backing plate 18, friction material is forced into and through the apertures and after curing serve to resist shear forces between the pad 20 and backing plate 18 during brake application.

Friction pad 20 is further provided with double chamfered leading and trailing edges 28 and 29 respectively. When new, or so long as the frictional surface of pad 20 wears evenly the centroid thereof will coincide with the center of pressure P which is fixed by the hydraulic piston geometry. Thus a uniform loading is applied to the rotor by pad 20 over its friction surface. Should, for example, the leading portion of pad 20 wear unevenly or at a faster rate than the trailing portion, the frictional surface area increases by reason of chamfer 28 thus causing the centroid of the friction surface area to translate to C' or C" depending upon the particular wear pattern experienced. However, the center of pressure P remains fixed coincident with the piston axial center line causing an increased surface pressure loading over the trailing portion of the pad friction surface and a decrease in surface loading over the leading portion of pad 20. Thus the pad tends to correct its wear pattern and return the centroid to the center of pressure P thereby restoring uniform loading and pad wear. By reason of the double chamfer, friction pad 20 will tend to correct for uneven wear in both the circumferential and radial directions.

Figure 20:
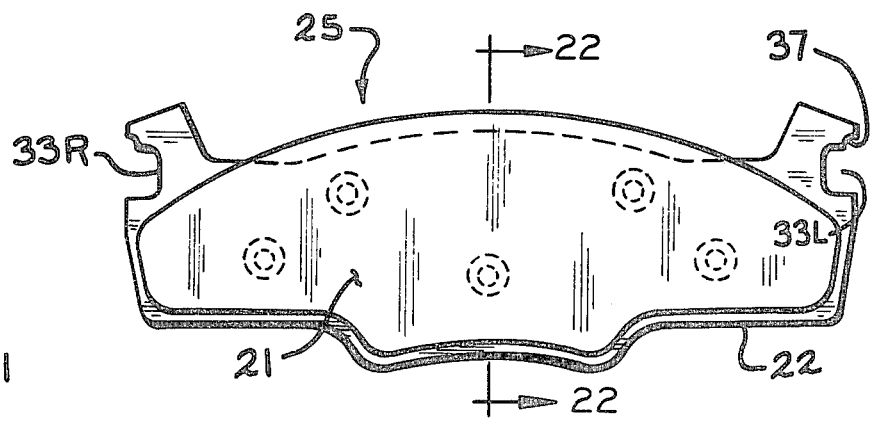
FIG. 20 is an elevational view looking outboard at the outboard brake shoe assembly used in the disc brake shown in FIG. 1.
Figure 22:
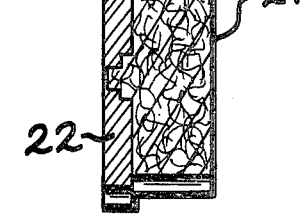
FIG. 22 is a cross-sectional view taken along line 22—22 of FIG. 20.
Figure 21:
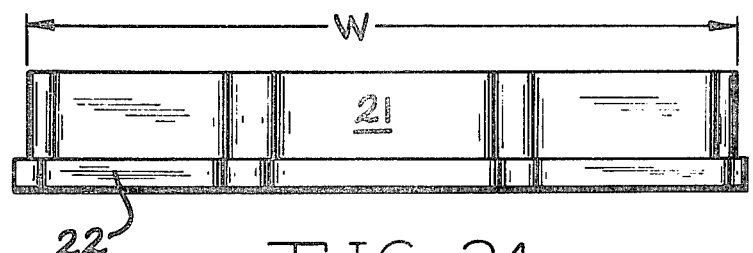
FIG. 21 is a bottom view of the brake shoe assembly shown in FIG. 20.

FIGS. 20 through 22 show the preferred configuration of the outboard brake shoe assembly 25. Similar to the inboard brake shoe assembly 19 described above, friction pad 21 is molded onto back plate 22 which also has double step bore apertures therein receiving friction material therein to resist shear forces between pad 21 and backing plate 22. Although the outboard friction pad 21 may be provided double chamfered leading and trailing edges it is not believed necessary because of the uniform force applied to backing plate 22 by the caliper outboard leg 13.

As an alternative and upon reuse of backing plates 18 and 22, the double step bore apertures 27 may serve to accommodate the application of riveted frictional material thereto. One merely applies the friction pad to the reverse side of the backing plate and the double step bore 27 accommodates the rivet fastener therein.

Outboard brake shoe assembly 25 is preferably configured so as to prevent its inadvertent installation on the inboard side of rotor 24. Therefore the width W of friction pad 21 is such that pad 21 interferes with anchor plate arms 26L and 26R preventing insertion of brake pad assembly 25 on the inboard side of the rotor. As a further prevention against installing the outboard brake shoe upon the inboard side of the rotor when the pad 21 is worn thin the backing plate width is such that it abuts against anchor plate ledges 38L and 38R (FIG. 6) preventing alignment of guide grooves 33L and 33R with guide rails 30L and 30R.

Figure 5:
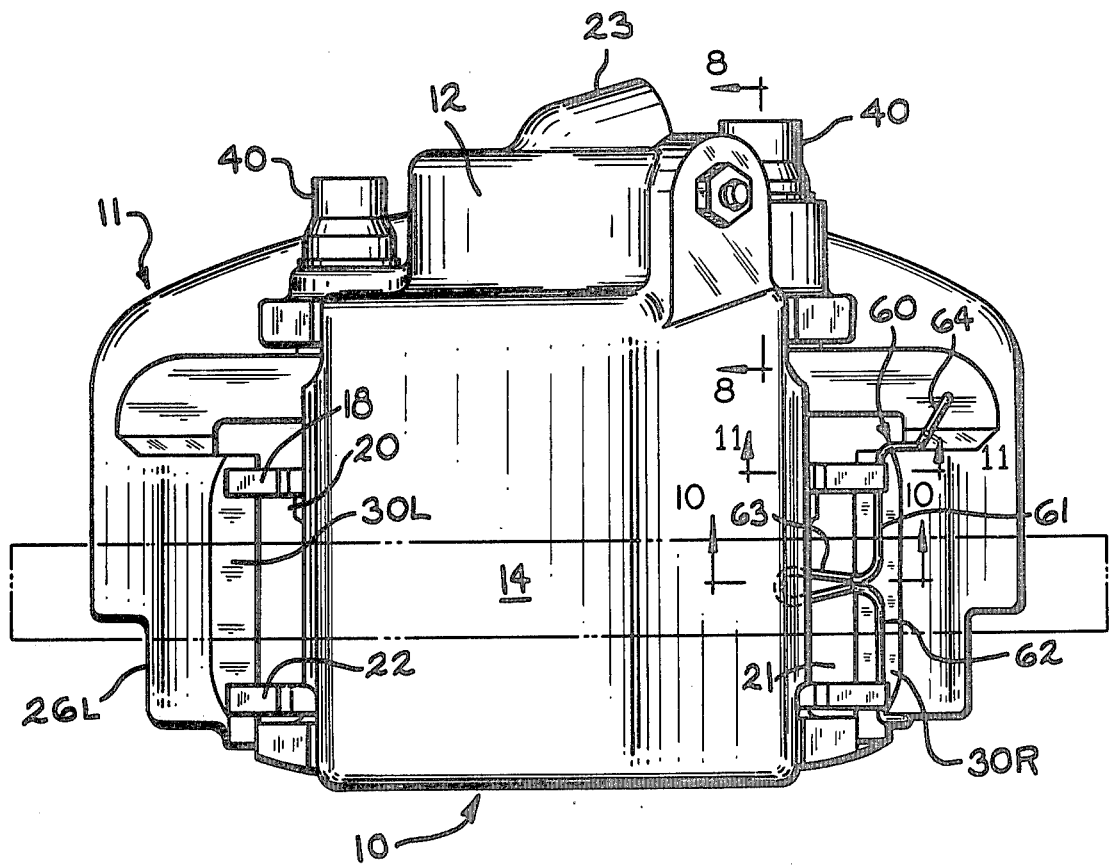
FIG. 5 is a top plan view of the disc brake shown in FIG. 1.
Figure 6:
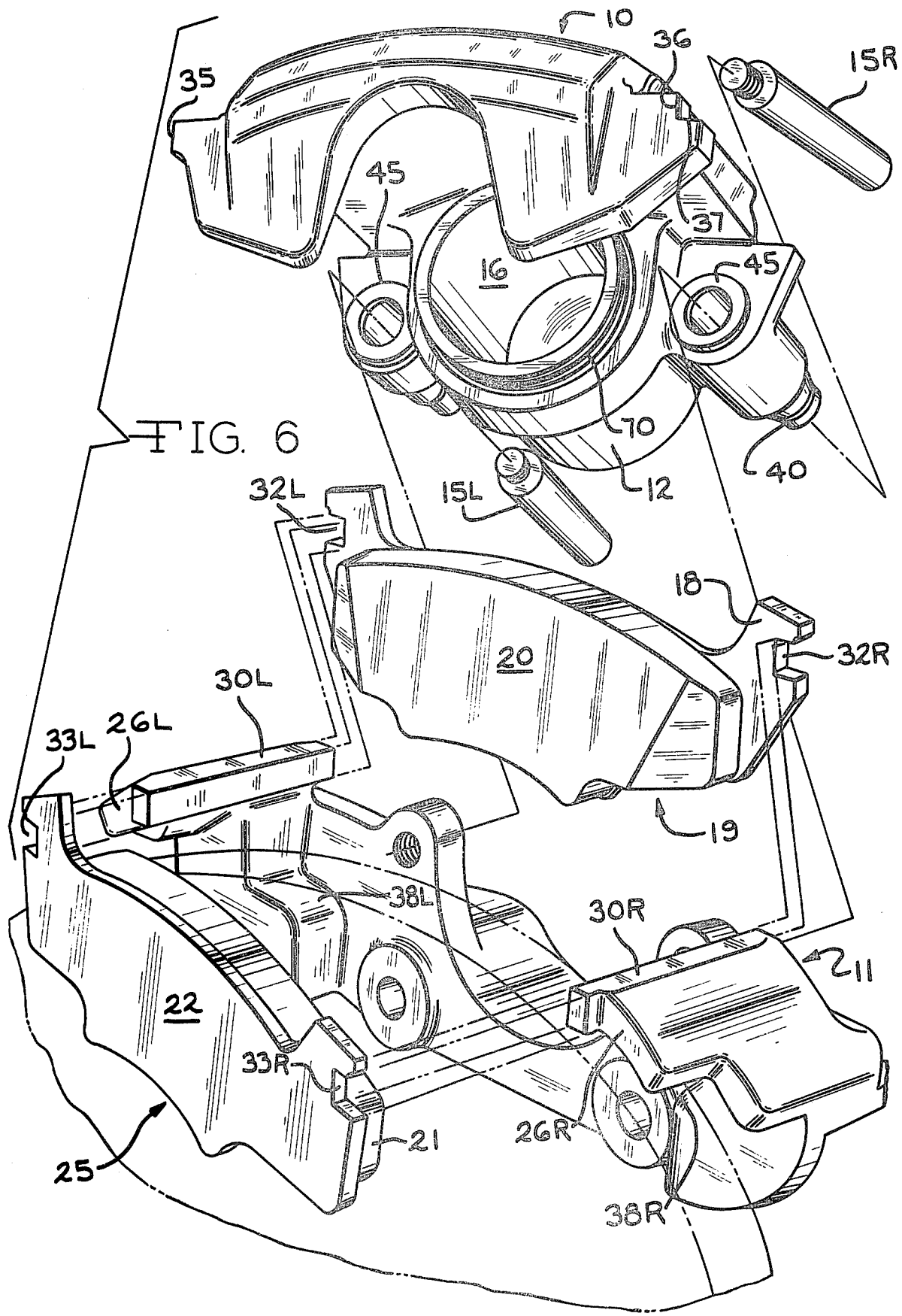
FIG. 6 is an exploded perspective view, partly broken away and partly in diagrammatic form, of the disc brake shown in FIG. 1.
Figure 18:
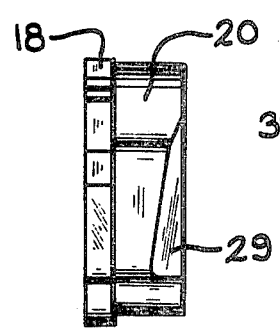
FIG. 18 is an end view of the brake shoe assembly shown in FIG. 16.
Figure 16:
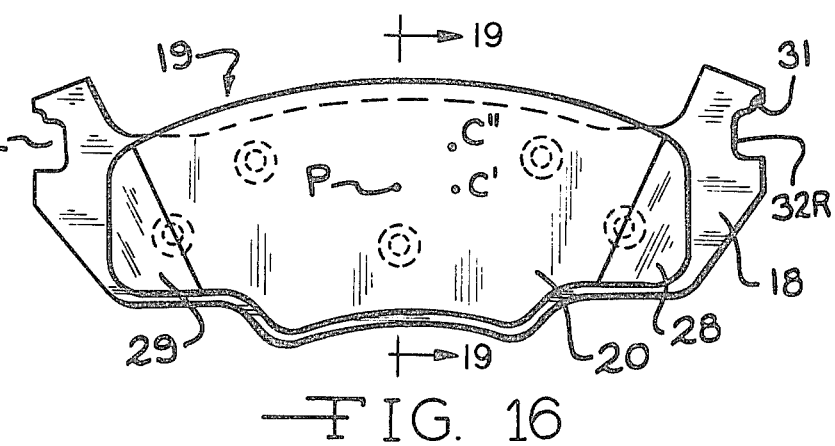
FIG. 16 is a front elevational view of the inboard brake shoe assembly used in the disc brake shown in FIG. 1.
Figure 19:
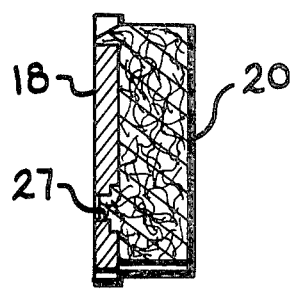
FIG. 19 is a cross-sectional view taken along line 19—19 of FIG. 16.
Figure 17:
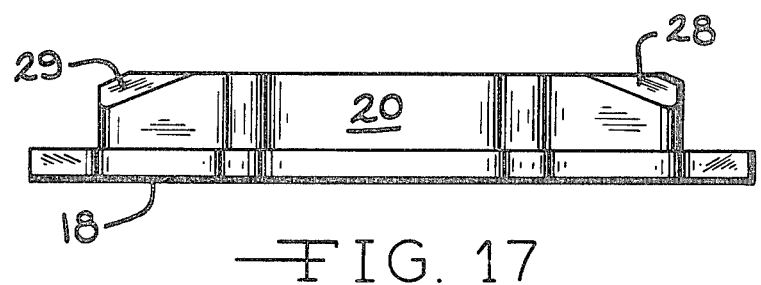
FIG. 17 is a bottom view of the brake shoe assembly shown in FIG. 16.

FIGS. 12 and 13 show anti-rattle clip 60 which is preferably constructed of spring steel wire comprising two longitudinally extending segments 61 and 62 (see also FIG. 5) projecting oppositely away from looped hook 63. Inboard segment 61 terminates in looped projection 64 which serves as a finger hold for insertion or removal of clip 60. Clip 60 is positioned as shown in FIGS. 5, 10 and 11 such that inboard segment 61 and outboard segment 62 lie axially along rail guide 30R and are respectively disposed within notch 31 and 39 of inboard backing plate 18 and outboard backing plate 22. Looped hook 63 extends under and engages the bottom surface of caliper bridge 14 thereby providing a torsional spring force in clip segments 61 and 62 tending to force backing plates 18 and 22 into frictional engagement with rail guides 30L and 30R thereby preventing rattling of the backing plates upon rail guides 30L and 30R.

To further assist in applying a positive force upon backing plates 18 and 22, it is preferred to preload the spring clip legs 61 and 62 as shown by the broken line extensions of FIG. 13. Alternatively the legs 61 and 62 may be preloaded as shown by the broken line extensions shown in FIG. 12 or preloaded in both directions. However it has been found that preloading as shown in FIG. 13 along proves satisfactory.

FIG. 14 presents an enlarged cross-sectional view of piston dust boot 70. Dust boot 70 comprises an integral one piece molding of an elastomeric material, such as rubber, having an annular bead 71 suitably received in annular groove 38 of piston 17, flexible bellows portion 72 radially extends to and terminates at annular flange 73. Annular flange 73 has molded therein a rigid annular ring 74 and is fixedly received in annular groove 75 cut into caliper inboard leg 12 about the hydraulic cylinder bore 17.

The outside diameter of the inner bead 71 is slightly less than the inside diameter of the peripheral groove 38 of the piston 17. The outside diameter of the outer band 73 is slightly larger than the inside diameter of the annular wall of the groove 75. The ring 74 may be a rigid metal hoop integrally molded within the band 73. As shown in FIG. 14, in one embodiment, the metal hoop or ring 75 has a generally S shaped cross-section. One leg of the S extends axially parallel to a portion of the annular wall of the cylinder groove.

By encapsulating ring 74 within elastomeric material, a compression fit is thereby obtained within groove 75 assuring retention of dust boot 70. Further ring 74 and groove 75 are sealed from moisture and other contaminants which would tend to cause corrosion making it difficult to remove boot 70 and require groove maintenance prior to replacing boot 70 upon brake servicing.

Sealing piston 16 hydraulically within cylinder 17 is accomplished by use of annular seal means 55 positioned within annular groove 56 in the wall of cylinder 17 as shown in FIG. 7A. The floor of groove 56 has a portion thereof 57 axially paralleling cylinder 17 and a portion 58 sloped at angle x. Preferably angle x is fifteen degrees (15°) and the ratio of portion 57 to portion 58 is preferably three to one (3:1).

It has been common practice in the industry to provide a groove floor sloped at approximately 7° so as to cause the seal to compressingly grip the piston thereby resisting inboard movement of the piston upon deactivation of the brake. However, it has been noticed that many times too much resistance is experienced causing the brake shoe assemblies to slightly drag. By varying the ratio of floor portion 57 to portion 58 various piston resistance forces may be obtained thereby permitting one to taylor such resistance to the particular brake assembly without need for specially engineered elastomeric seals. In addition to varying the ratio of floor portion 57 to 58 the slope or angle x may also be varied adding another variable to consider. The seal 55 may be either of rectangular cross-section or may be shaped to conform to the floor configuration.

FIG. 7B presents a typical plot of seal compressive force against piston travel. The curve identified as "Standard Groove" represents the force distribution for a groove floor sloped at a constant 7° as known in the prior art. The curve identified as "Improved Groove" represents the force distribution for a groove floor as shown in FIG. 7A having a ratio of portion 57 to portion 58 of 3:1 and x being 15°.

The foregoing description presents the preferred embodiment of this invention. Modifications and alterations may occur to those skilled in the art which will come within the scope and spirit of the following claims.

I claim:

1. A sealing boot for use in a cylinder and piston assembly of a vehicle brake system, such piston having a peripheral groove and such cylinder having an annular wall, said sealing boot comprising, an inner bead portion for mounting in such peripheral groove of such piston, an outer annular band portion for mounting adjacent such annular wall, said band portion including a rigid annular ring and an outer elastomeric layer, wherein said elastomeric layer is compressed between said rigid annular ring and such annular wall when said sealing boot is mounted in such brake system, and an elastomeric bellows portion integrally connected between said inner bead portion and said outer annular band portion.

2. A sealing boot in accordance with claim 1 in which the outside diameter of said inner bead portion is slightly less than the inside diameter of said peripheral groove of said piston and the outside diameter of said outer band portion is slightly larger than the inside diameter of said annular wall.

3. The sealing boot as claimed in claim 1 wherein said ring comprises a rigid metal hoop integrally molded within said band portion.

4. The sealing boot as claimed in claim 3 wherein said metal hoop has a generally S shaped cross-section whereby one leg of said S extends axially parallel to said annular wall compressing said elastomeric layer between said leg and said annular wall.

5. A sealing boot for use in a cylinder and piston assembly of a vehicle brake system, such piston having a peripheral groove and such cylinder having an annular wall parallel to the longitudinal axis of said piston, said sealing boot comprising, an elastomeric inner bead portion for mounting in such peripheral groove of such piston, an outer annular band portion for mounting adjacent such cylinder annular wall, said band portion including an "S" shaped metal hoop having a leg parallel to such annular wall of such cylinder, said band portion also including an integral elastomeric layer on said leg, wherein said elastomeric layer is compressed between such annular wall and said leg when said sealing boot is mounted in such brake system and an integral elastomeric bellows portion extending between said inner bead portion and said outer bead portion.

* * * * *